United States Patent [19]

Hiroi et al.

[11] Patent Number: 4,951,191
[45] Date of Patent: Aug. 21, 1990

[54] PROCESS CONTROL HAVING IMPROVED COMBINATION OF FEEDFORWARD FEEDBACK CONTROL

[75] Inventors: Kazuo Hiroi; Kojiro Ito, both of Tokyo, Japan

[73] Assignee: Kabushiki Kaisha Toshiba, Kawasaki, Japan

[21] Appl. No.: 211,263

[22] Filed: Jun. 24, 1988

[30] Foreign Application Priority Data

Jun. 26, 1987 [JP] Japan ............................. 62-157910

[51] Int. Cl.$^5$ ...................... G05B 13/02; G06F 15/46
[52] U.S. Cl. ................................. 364/165; 364/164; 364/157; 364/162
[58] Field of Search ............... 364/165, 157, 158, 159, 364/164, 160–163, 178, 176

[56] References Cited
U.S. PATENT DOCUMENTS

| | | | |
|---|---|---|---|
| 4,489,376 | 12/1984 | Putnam | 364/165 |
| 4,563,735 | 1/1986 | Hiroi et al. | 364/165 |
| 4,663,703 | 5/1987 | Axelby et al. | 364/165 |
| 4,698,745 | 1/1987 | Hiroi et al. | 364/165 |
| 4,714,988 | 12/1987 | Hiroi et al. | 364/165 |
| 4,761,595 | 8/1988 | Goor | 364/165 |

Primary Examiner—Jerry Smith
Assistant Examiner—Paul Gordon
Attorney, Agent, or Firm—Oblon, Spivak, McClelland, Maier & Neustadt

[57] ABSTRACT

A process controller includes a change fetch circuit for fetching a change in feedforward controlled variable due to a variation in load, and an auto-tuning control circuit for performing auto-tuning for mis-matching of the feedforward control, in accordance with a compensation variable obtained by multiplying a ratio of an adjusted output signal of a feedback control system corrected by the feedforward control to the feedforward controlled variable, with the change in feedforward controlled variable, to determine an optimal next feedforward controlled variable.

15 Claims, 4 Drawing Sheets

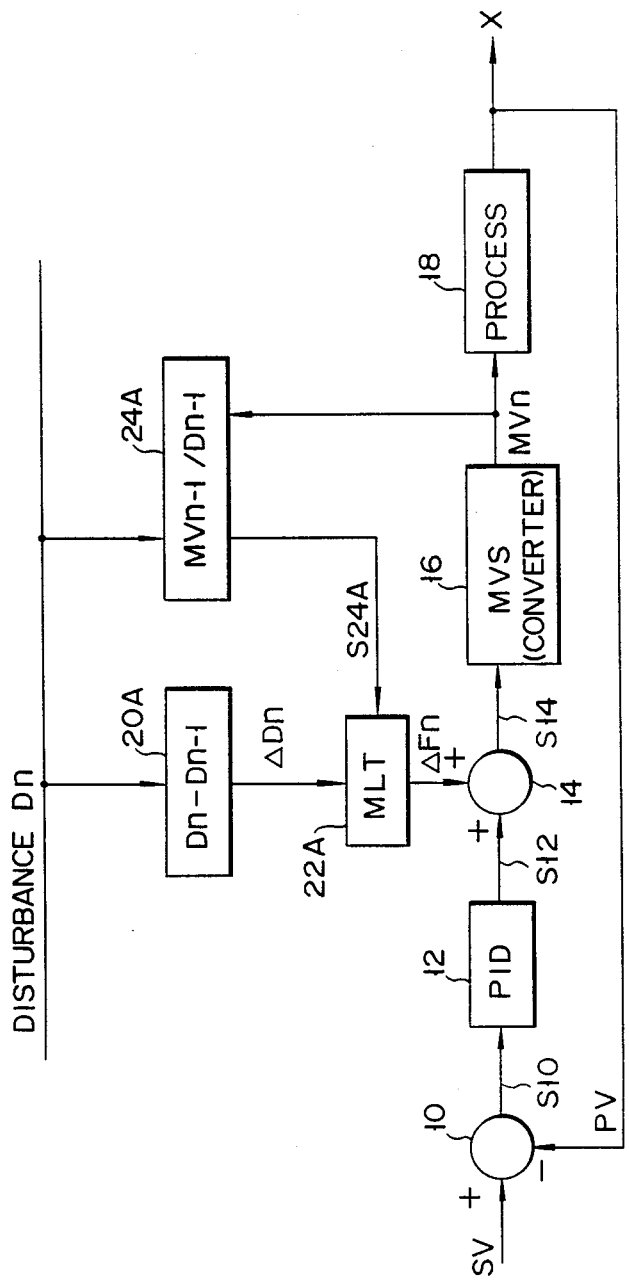
F I G. 1

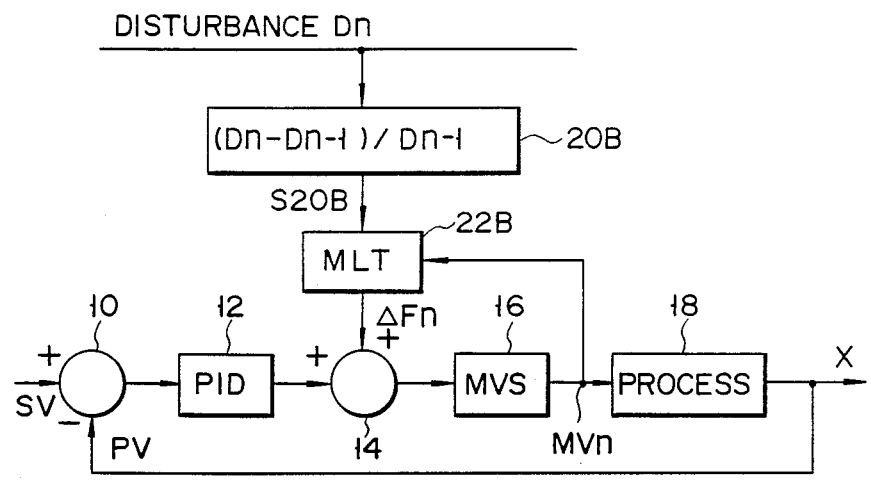
F I G. 4
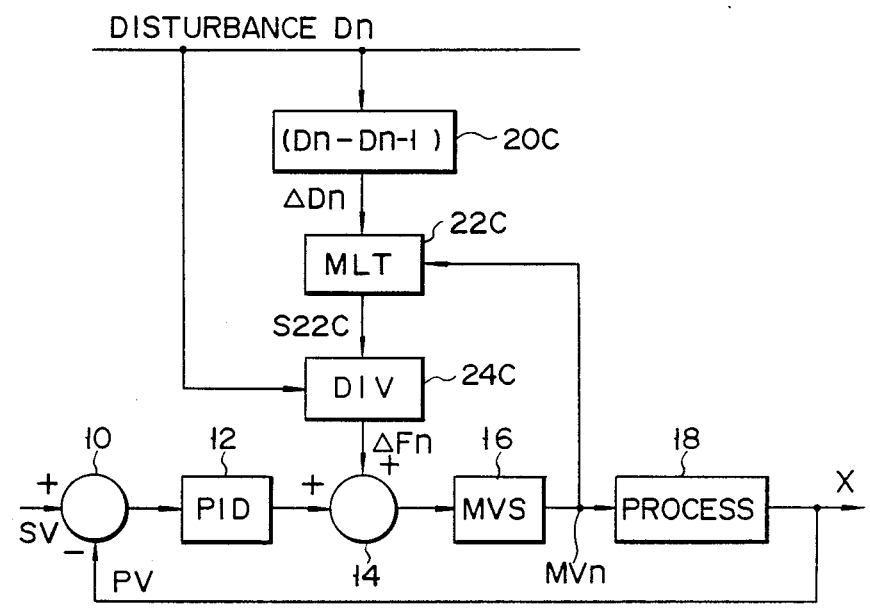
F I G. 5

PROCESS CONTROL HAVING IMPROVED COMBINATION OF FEEDFORWARD FEEDBACK CONTROL

BACKGROUND OF THE INVENTION

1. Field of the Invention

The present invention relates to a process controller having a combination of feedback and feedforward control systems and, more particularly, to a process controller having an improved auto-tuning means for feedforward control due to a variation in load.

2. Description of the Prior Art

The present invention is an improvement of U.S. Pat. No. 4,714,988 (Hiroi et al.) filed by the present applicant on Dec. 22, 1987, and incorporates all the disclosure contents of the above Patent.

In a variety of manufacturing plants, it is most important to achieve a highly-flexible productivity, energy saving, and high-quality products. For this purpose, the plants must be controlled by optimal control parameters. However, in a control system being subjected to a large change in the influence of a disturbance or the like, it is very difficult to select optimal control parameters. Thus, demand has arisen for an auto-tuning means which can relatively easily and automatically tune optimal control parameters in a control system whose control parameters are difficult to select.

With the aim of satisfying this demand, a process controller having an auto-tuning function of a feed-forward model has been developed, and is shown in FIG. 5 of U.S. Pat. No. 4,714,988. This apparatus will now be described in conjunction with the reference numerals used in the above Patent.

This process controller comprises feedback and feedforward control systems. In the feedback control system, comparator 31 calculates deviation en in accordance with target variable SV and process variable X obtained by measuring controlled variable X. Deviation en is supplied to adjusting unit 32, which performs a speed PID operation. The PID output from adjusting unit 32 is then converted to position signal A by speed-position signal converter 34 through adder 33. Position signal A is supplied to adder 35, in order to obtain manipulation signal M. Manipulation signal M, once obtained, is supplied to object 36 to be controlled, thus adjusting controlled variable X.

In the feedforward control system, multiplier 40 derives feedforward controlled variable B from disturbance signal D. Thereafter, a variation in the control system, caused by disturbance signal D, is compensated for by static and dynamic characteristic compensation means.

The static characteristic compensation means comprises difference arithmetic unit 51, switch 62B, and the like. Feedforward controlled variable B, obtained by multiplier 40, is converted to speed signal C by difference arithmetic unit 51. Speed signal C is then supplied to adder 33, through switch 62B1. The dynamic characteristic compensation means comprises incomplete differentiator 42, switch 62B, and the like. Differentiator 42 derives change E in dynamic characteristics from feedforward controlled variable B, and supplies it, through switch 62B2, to adder 35.

In the process controller described above, a parameter (coefficient) for the feedforward control system is determined as follows:

The auto-tuning control means comprises subtractor 43, which derives a deviation signal, between feed-forward controlled variable B and output signal A, from speed-position signal converter 34. In addition to the deviation signal, the auto-tuning control means derives control deviation signal en, static characteristic compensation signal C, and dynamic characteristic compensation signal E, and supplies these signals to corresponding signal level detectors 55 to 59. Signal level detector 55 outputs an ON signal (H) when the deviation signal exceeds a predetermined range, while, in contrast, the other signal level detectors 57 to 59 output ON signals (H) when their input signals (C, E, en) fall within the predetermined range. When the ON signals are output from all signal level detectors 55 to 59, a start control signal is output from an AND circuit (60, 61), thereby starting a timer circuit (62–64). After a predetermined period of time has passed from the starting of the timer circuit, the timer circuit outputs a tuning timing signal to turn on switch 62A. When switch 62A is turned on, the deviation signal is input, through switch 62A, to feedforward parameter correction arithmetic unit 44 in order to determine a parameter for feedforward control. Thus, tuning control is performed on the basis of this parameter. More specifically, feedforward parameter correction arithmetic unit 44 corrects a feedforward reference parameter using an integral value of the deviation signals, and a predetermined coefficient, and outputs the obtained parameter to multiplier 40. The feedforward control parameter is tuned (automatically tuned) so that the deviation signal from subtractor 43 becomes zero. During parameter tuning, switches 62B1 and 62B2 are kept off, for the purpose of suppressing a variation in manipulated variable, caused during tuning of the feedforward parameter.

However, the auto-tuning control means described above fetches a number of operating state signals (C, E, en, etc.) from respective sections of the apparatus, and automatically tunes the parameter under the stable conditions, and, in some plants, it is difficult to obtain an auto-tuning timing. If the stable conditions are moderated, tuning accuracy of the parameter is largely degraded.

A large number of functions are added to obtain an auto-tuning timing, resulting in a very complicated arrangement. In addition, many loop controllers adopt distributed type controllers. In this case, in order to realize a compact apparatus and function dispersing, a memory capacity is limited, and hence, the apparatus cannot have so many functions. If the apparatus is designed to have all the functions of that shown FIG. 5 in U.S. Pat. No. 4,714,988, a large volume of calculation processing, and processing data therefor must be stored, thus requiring a considerably large memory capacity. Nevertheless, it is still difficult to design the apparatus to have all these functions.

SUMMARY OF THE INVENTION

The present invention has been developed in consideration of the above situation, and has as its object to provide a process controller which can continuously perform feedforward tuning control regardless of a tuning timing, and can reliably perform auto-tuning by means of a simple arrangement, and without influencing other control functions.

In order to achieve the above object, a process controller according to the present invention comprises: change fetch means for fetching a change ($\Delta Dn$) in a feedforward controlled variable, arising from a variation in load or the like; and auto-tuning control means for performing auto-tuning, to compensate for mis-matching of the feedforward control, in accordance with a compensation variable ($\Delta Fn$) obtained by multiplying a ratio ($MVn-1/Dn-1$) of an adjusted output signal ($MVn-1$) of a feedback control system, corrected by feedforward control, to the feedforward controlled variable ($Dn-1$), with the change ($\Delta Dn$) in feedforward controlled variable ($Dn$), so as to determine an optimal next feedforward controlled variable.

BRIEF DESCRIPTION OF THE DRAWINGS

FIG. 1 is a block diagram showing a basic arrangement of a process controller according to an embodiment of the present invention, wherein a feedforward system includes a static characteristic compensation circuit (14, 20A-24A);

FIG. 4 is a block diagram showing a modification (20B-22B) of the static characteristic compensation circuit shown in FIG. 1; and FIG. 5 is a block diagram showing another modification (20C-24C) of the static characteristic compensation circuit shown in FIG. 1.

DETAILED DESCRIPTION OF THE PREFERRED EMBODIMENTS

Figure 2:
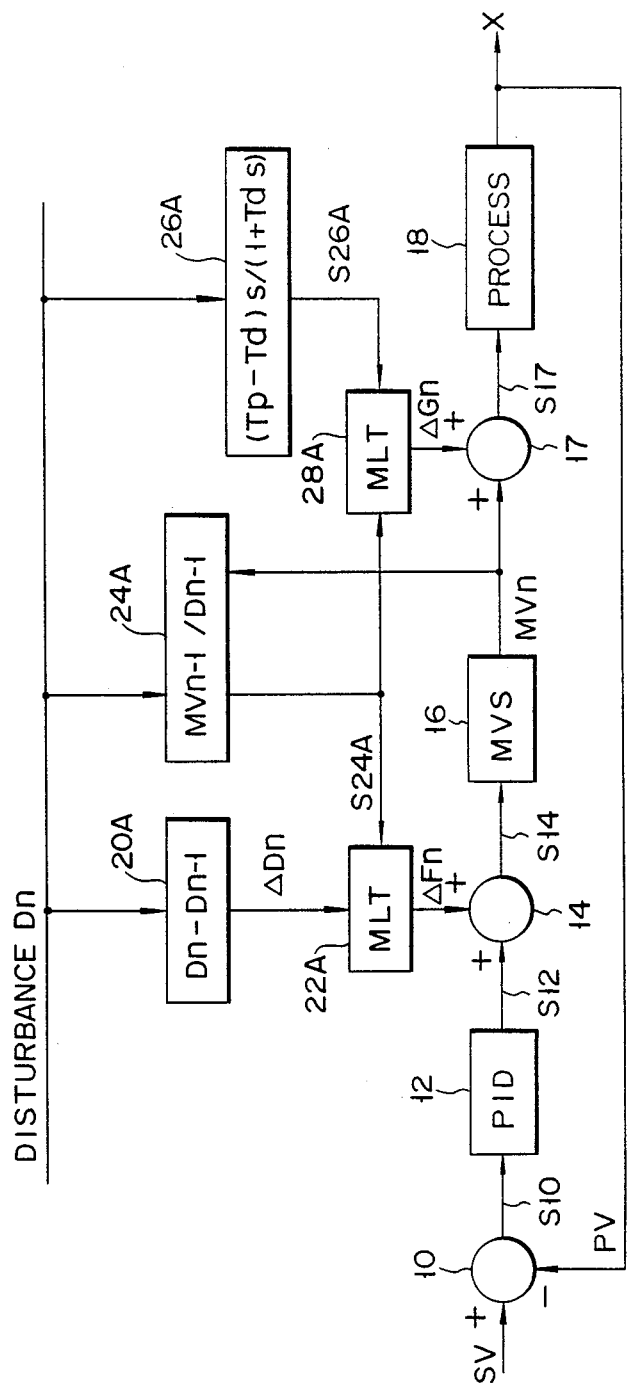
FIG. 2 is a block diagram showing a process controller according to another embodiment of the present invention, wherein a feedforward system includes a static characteristic compensation circuit (14, 20A-24A) and a dynamic characteristic compensation circuit (17, 26A-28A)

Preferred embodiments of the present invention will now be described, with reference to the accompanying drawings. To avoid repeated descriptions, the same or similar reference numerals denote the same or similar portions throughout the drawings.

Except for it not having a dynamic characteristic compensation circuit (17, 26A-28A), the embodiment shown in FIG. 1 has the same arrangement as that shown in FIG. 2, and thus both embodiments will be described at the same time, in regard to that part of their arrangement they share in common.

In FIG. 1, target variable SV of process control is input to the positive input terminal (+) of comparator part 10, and process controlled variable X (PV) is fed back to the negative input terminal (−) thereof. Difference signal S10, representing the difference between the variables, is output from comparator part 10 and supplied to PID arithmetic unit 12, where it is subjected to a proportional integral/differential operation to produce signal S12, which is input to adder part 14. Adder part 14 receives static characteristic compensation signal $\Delta Fn$ corresponding to a static change in feedward controlled variable (to be described later).

Output S14 from adder part 14 is input to manipulated variable summing unit (MVS) 16. If a manipulation signal at an immediately preceding timing is given as $MVn-1$, a manipulation signal at a present timing is given as $MVn$, and a change in manipulated variable between the preceding and present timings is given as $\Delta MVn$, then MVS 16 has a function expressed by $MVn=MVn-1+\Delta MVn$.

In the embodiment shown in FIG. 1, manipulation signal $MVn$ from MVS 16 is supplied to process 18 as an object to be controlled, and process controlled variable X is fed back from process 18 to comparator part 10.

In the embodiment shown in FIG. 2, manipulation signal $MVn$ from MVS 16 is input to adder part 17. Adder part receives dynamic characteristic compensation signal $\Delta Gn$ corresponding to a dynamic change in feedforward controlled variable (to be described later). Output S17 from adder part 17 is supplied to process 18 as an object to be controlled, and process controlled variable X is fed back from process 18 to comparator part 10.

If a time constant of process 18 is given as Tp, a time constant of a disturbance is given as Td, and a complex parameter is given as s, the transfer function of incomplete differentiator part 26A, shown in FIG. 2 is expressed by:

$$(Tp-Td)s/(1+Td.s)$$

The arrangement of a feedforward control system (20A-24A) will be described below. The feedforward control system includes change arithmetic unit 20A, which serves as a change fetch means. Change arithmetic unit 20A detects change $\Delta Dn$ ($=Dn-Dn-1$) from a difference between previous disturbance signal $Dn-1$ and present disturbance signal $Dn$, and outputs the change to multiplier part 22A.

In the apparatus shown in FIG. 2, change $\Delta Dn$ in disturbance signal $Dn$ is divided into static and dynamic characteristic compensation components, thereby compensating for a change of the control system as a result of the disturbance signal. However, the arrangement for dynamic characteristic compensation is omitted from the apparatus shown in FIG. 1.

If change $\Delta Dn$ in disturbance signal obtained by change arithmetic unit 20A, i.e., a change in feedforward controlled variable $Dn$, is directly input to adder part 14 of the feedback control system as static characteristic compensation component $\Delta Fn$, mis-matching occurs in the feedforward parameter, and optimal control sometimes fails. For this reason, the static characteristic compensation means must include tuning control means (22A, 24A).

The tuning control means includes divider part 24A for dividing output $MVn$, from MVS 16 in the feedback control system, by disturbance signal $Dn$. Quotient signal S24A, obtained by divider part 24A, is input to multiplier part 22A. Multiplier part 22A multiplies output S24A from divider part 24A by change $\Delta ADn$ in the disturbance signal to obtain static characteristic compensation signal $\Delta Fn$ for performing optimal feedforward control. Multiplier part 22A outputs signal $\Delta Fn$ to adder part 14.

The dynamic characteristic compensation means for obtaining a dynamic characteristic compensation component shown in FIG. 2 has incomplete differentiator part 26A, and multiplier part 28A for multiplying output S26A from differentiator part 26A with output S24A from divider part 24A. The output from multiplier part 28A is input as dynamic characteristic compensation signal $\Delta Gn$ to adder part 17, and is added to manipulation signal $MVn$, which is the output from MVS 16.

Prior to a description of the operation of the apparatus having the above arrangement, auto-tuning control of a conventional apparatus will be exemplified for the sake of easy understanding of the apparatus of the present invention. In this apparatus, a feedforward parameter is corrected such that a combination output (manipulation signal MVn) of feedback and feedforward control systems becomes equal to feedforward controlled variable En, thereby tuning mis-matching of feedforward control. If a reference value of feedforward controlled variable En is given as En0, value En0 is expressed by:

$$En0 = k0 \cdot Dn \tag{1}$$

(where k0 is a proportional coefficient, and n indicates a control execution timing) If manipulation signal MVn in this case is not equal to En, this signifies a mis-matching of feedforward control. In order to eliminate the mis-matching, when a difference between MVn and En exceeds a predetermined range, coefficient k0 must be tuned to be k1 by a feedforward parameter correction arithmetic operation to yield MVn = En. For this purpose, parameter x to be corrected must be obtained. If $En = k1 \cdot Dn = x \cdot k0 \cdot Dn = x \cdot En = MVno$, x is calculated by:

$$x = MVn/En0 \tag{2}$$

If $k1 = k0 + \Delta k$ and correction parameter $\Delta k$ is obtained from this equation, $\Delta k$ is given by:

$$\begin{aligned}
\Delta k &= k1 - k0 = x \cdot k0 - k0 \\
&= k0(x - 1) \\
&= k0 \cdot \{(MVn/En0) - 1\} \\
&= (En0/Dn) \cdot \{(MVn - En0)/En0\} \\
&= (MVn - En0)/Dn
\end{aligned} \tag{3}$$

If either equation (2) or (3) is used, tuning satisfying En=MVn can be achieved.

After auto-tuning is performed using parameter k1 obtained by the feedforward parameter arithmetic operation, when disturbance signal D is changed from Dn−1 at timing n−1 to Dn at timing n (present timing), feedforward controlled variable En is:

$$\begin{aligned}
En &= k1 \cdot Dn = x \cdot k0 \cdot Dn \\
&= x \cdot k0 \cdot Dn - 1 \cdot (Dn/Dn - 1) \\
&= En - 1 \cdot (Dn/Dn - 1) = MVn - 1 \cdot (Dn/Dn - 1)
\end{aligned} \tag{4}$$

If equation (4) is converted to a speed signal as a static characteristic compensation component and is calculated for change $\Delta En$ in feedforward controlled variable between the previous and present timings, $\Delta En$ is expressed as follows:

$$\begin{aligned}
\Delta En &= En - En - 1 = En - MVn - 1 \\
&= MVn - 1 \cdot (Dn/Dn - 1) - MVn - 1 \\
&= MVn - 1\{(Dn - Dn - 1)/Dn - 1\}
\end{aligned} \tag{5}$$

Equation (5) can be rewritten as:

$$\begin{aligned}
\Delta En &= (MVn - 1/Dn - 1) \cdot (Dn - Dn - 1) \\
&= (MVn - 1/Dn - 1) \cdot \Delta Dn
\end{aligned} \tag{6}$$

In the apparatus shown in FIG. 1 or 2, the feed-forward control system includes change arithmetic unit 20A and divider part 24A for deriving change $\Delta Dn$ in feedforward controlled variable and a ratio (MVn−1/Dn−1). Thus, static characteristic compensation signal $\Delta Fn$ is supplied to adder part 14 using a product of change $\Delta Dn$ and the ratio (MVn−1/Dn−1), thereby performing feedforward control. If $\Delta Dn$ is directly input to adder part 14 as $\Delta Fn$, mis-matching of feedforward control occurs as described above.

In the apparatus shown in FIG. 1 or 2, adjusted output MVn of the feedback control system, which is corrected by feedforward control is fetched, and signal MVn−1, obtained immediately before fetching, is divided by feedforward controlled variable Dn−1 due to a disturbance signal at that time. Obtained quotient signal S24A (MVn−1/Dn−1) is multiplied with change $\Delta Dn$ in signal, thereby obtaining static characteristic compensation component $\Delta Fn$ for feedforward control:

$$\Delta Fn = MVn - 1 \cdot (Dn - Dn - 1)/Dn - 1 \tag{7}$$

Equation (7) can provide the same compensation component as that obtained by equation (5). In other words, the apparatus of the present invention can determine an optimal feedforward controlled variable at the present point and thereafter without using a tuning timing signal fetch means and a feedforward parameter arithmetic unit means unlike in the conventional apparatus such as U.S. Pat. No. 4,714,988 or the like.

Therefore, with the arrangements of the embodiments, a mis-matching component of feedforward control can be canceled by optimal feedforward controlled variable $\Delta Fn$ obtained by combining an adjusted output signal (manipulation signal MVn) from the feedback control system which is corrected by feedforward control and signal Dn proportional to a value of a feedforward controlled factor such as a disturbance. Thus, difficulty in timing, i.e., to obtain a tuning timing signal after stable conditions of operating state signals (C, E, en, etc.) of the respective sections of the apparatus are satisfied like in the apparatus shown in FIG. 5 of the above U.S. Patent, can be eliminated, and a problem of a degraded tuning accuracy can be solved.

The apparatus of the present invention can always perform auto-tuning of feedforward control regardless of a tuning timing. In this case, the auto-tuning function can be effected without adversely affecting other control functions. The arrangement can be much simplified as compared with the above U.S. Patent, and calculation factors necessary for control can be greatly reduced. Thus, the capacity of a memory used for the calculations can be reduced, and the apparatus can be made compact. For example, the present invention is effective for distributed type control in a loop controller.

In the embodiment shown in FIG. 2, compensation of a feedforward controlled variable due to disturbance is performed by separately using static and dynamic characteristic compensation components. However, the present invention can be effectively applied to a feedforward control system which does not have a dynamic characteristic compensation component, as shown in FIG. 1.

Figure 3:
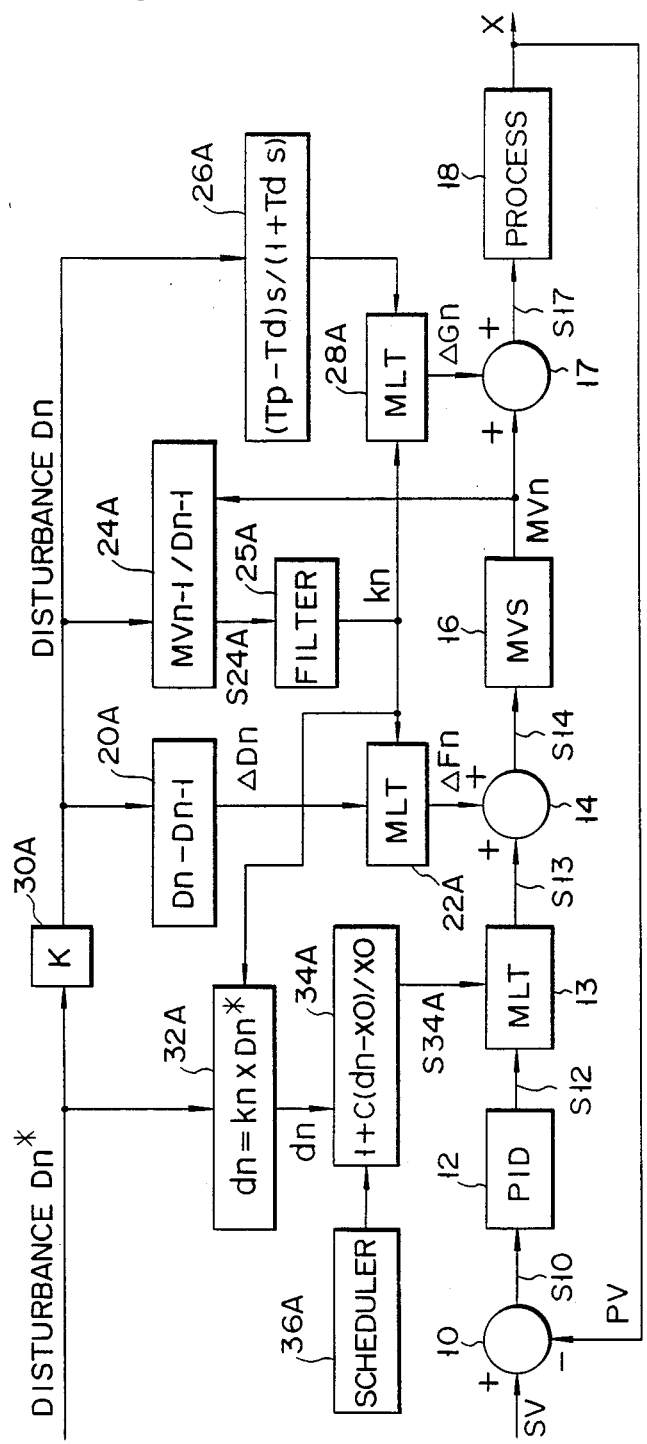
FIG. 3 is a block diagram showing a process controller according to still another embodiment of the present invention, wherein a feedforward system includes a feedforward gain adaptive mechanism (13, 30A-36A) in addition to a static characteristic compensation circuit (14, 20A-24A) and a dynamic characteristic compensation circuit (17, 26A-28A)

FIG. 3 shows a process controller according to still another embodiment of the present invention. In this embodiment, a feedforward system includes a feedforward adaptive mechanism (13, 30A–34A) in addition to a static characteristic compensation circuit (14, 20A–24A) and a dynamic characteristic compensation circuit (17, 26A–28A).

This embodiment employs a so-called adaptive feedforward/feedback control system suitable for a case wherein process 18 is a mixed process including a temperature, a concentration, and the like as parameters. Since the adaptive feedforward/feedback control system is a known technique as described in U.S. Pat. No. 4,698,745, how to apply the adaptive control method to this embodiment will be mainly described below. (Note that U.S. Pat. No. 4,698,745 is incorporated in the present application.)

In FIG. 3, disturbance Dn* is converted to disturbance Dn through coefficient multiplier 30A. Disturbance Dn corresponds to disturbance Dn shown in FIG. 2.

Gain tuning coefficient kn obtained by filtering output S24A from divider part 24A by low-pass filter 25A is input to multiplier parts 22A, 28A, and 32A. Multiplier part 32A receives disturbance Dn*, and its multiplication result (=kn×Dn*) is output to arithmetic unit 34A. Note that the adaptive operation of this embodiment can be altered by changing a time constant of filter 25A. For example, if a slow adaptive operation is to be performed, an integral time constant of filter 25A can be increased.

Arithmetic unit 34A performs an arithmetic operation given by 1+C(dn−x0)/x0. Arithmetic parameters (C, dn, x0) of arithmetic unit 34A are optionally tuned, and arithmetic unit 34A outputs its multiplication result S34A to multiplier part 13. Multiplier part 13 multiplies output S12 from PID arithmetic unit 12 with multiplication result S34A, and outputs multiplication result S13 to adder part 14.

In the case of a mixed process (temperature, concentration, and the like), parameter C is selected to be 1.0. In the case of a nonmixed process (pressure, flow rate, level, and the like), parameter C is selected to be 0. Parameter x0 represents a level (kn=1) of disturbance Dn upon determination of PID parameters. Parameter dn represents a product (upon determination of PID parameters, kn=1) of disturbance Dn and gain tuning coefficient kn.

In the embodiment shown in FIG. 3, feedforward control according to the content of process 18 can be appropriately performed.

FIG. 4 shows still another embodiment of the present invention. In this embodiment, change rate arithmetic unit 20B including change fetch means (20A in FIG. 1) is arranged to divide a difference (Dn−Dn−1) between previous and present disturbance signals Dn and Dn−1 by disturbance signal Dn−1 to obtain a quotient signal (Dn−Dn−1)/Dn−1. Obtained signal S20B is input to multiplier part 22B. Multiplier part 22B multiplies multiplication signal S22B with adjusted output signal MVn which is corrected by feedforward control so as to obtain static characteristic compensation signal ΔFn for feedforward control. Signal ΔFn is input to adder part 14 and is added to the output from adjusting unit 12.

With the arrangement of this embodiment, the arrangement can be further simplified as compared to FIGS. 1 to 3.

FIG. 5 shows an apparatus according to still another embodiment of the present invention. In this embodiment, change ΔDn in disturbance between previous and present timings is calculated by change rate arithmetic unit 20C, and multiplier 22C multiplies change ΔDn with output MVn−1 at the previous timing from MVS 16 to obtain output S22C expressed by MVn−1.ΔDn. Subsequently, output S22C is divided by disturbance Dn−1 at the previous timing, thus obtaining static characteristic compensation signal ΔFn.

Various other changes and modifications may be made within the scope of the invention.

According to the present invention a described above, a process controller which can continuously perform feedforward auto-tuning regardless of a tuning timing, and can reliably perform auto-tuning of parameters by a simple arrangement without adversely influencing other functions, can be provided.

What is claimed is:
1. A process controller comprising:
 (a) a feedback circuit including:
 first means for outputting a first signal corresponding to a difference between a control target variable and a process result,
 second means for outputting a second signal, which is obtained by converting the first signal based on a predetermined transfer function, and
 third means, controlled on the basis of the second signal, for outputting a control result; and
 (b) a feedforward circuit including:
 fourth means, responsive to an external signal and coupled to said second means, for detecting a static characteristic compensation signal representing a product of the second signal and a quotient obtained by dividing a difference between present and previous external signals with the previous external signal, and
 fifth means, coupled to said fourth means, said first means, and said second means, for supplying a composite signal of the first signal and the static characteristic compensation signal to said second means.

2. A controller according to claim 1, wherein said feedforward circuit further includes;
 sixth means, responsive to a time differential component value of the external signal and coupled to said fourth means, for detecting a dynamic characteristic compensation signal corresponding to the essential time differential component value of the external signal and the second signal, and
 seventh means, coupled to said sixth means, said second means, and said third means, for supplying a composite signal of the second signal and the dynamic characteristic compensation signal to said third means.

3. A controller according to claim 2, wherein said feedforward circuit further includes:
 eighth means, responsive to another external signal (Dn*) corresponding to the external signal (Dn) and coupled to said fourth means, for generating an adjustment signal corresponding to a product of said another external signal (Dn*) and a signal obtained by dividing the second signal by the external signal, and
 ninth means, coupled to said eighth means, said first means, and said fifth means, for supplying a composite signal of the first signal and the adjustment signal to said fifth means.

4. A controller according to claim 2, wherein said fourth means includes:

difference means, responsive to the external signal, for outputting a difference signal between the present and previous external signals, division means for outputting a quotient signal obtained by dividing the second signal, obtained when the previous external signal is obtained, by the previous external signal, and multiplication means for generating the static characteristic compensation signal from a product of the difference signal and the quotient signal.

5. A controller according to claim 2, wherein said fourth means includes division means, responsive to the external signal, for outputting a difference quotient signal obtained by dividing a difference between the previous and present external signal by the previous external signal, and means for generating the static characteristic compensation signal from a product of the difference quotient signal and the second signal.

6. A controller according to claim 2, wherein said fourth means includes:

difference means, responsive to the external signal, for outputting a difference signal between the present and previous external signals, multiplication means for generating a product signal from a product of the difference signal and the second signal, and division means for dividing the product signal by the previous external signal, to output the static characteristic compensation signal.

7. A controller according to claim 1, wherein said feedforward circuit further includes:

eighth means, responsive to another external signal (Dn*) corresponding to the external signal (Dn) and coupled to said fourth means, for generating an adjustment signal corresponding to a product of said another external signal (Dn*) and a signal obtained by dividing the second signal by the external signal, and ninth means, coupled to said eighth means, said first means, and said fifth means, for supplying a composite signal and the adjustment signal to said fifth means.

8. A controller according to claim 7, wherein said fourth means includes:

difference means, responsive to the external signal, for outputting a difference signal between the present and previous external signals, division means for outputting a quotient signal obtained by dividing the second signal, obtained when the previous external signal is obtained, by the previous external signal, and multiplication means for generating the static characteristic compensation signal from a product of the difference signal and the quotient signal.

9. A controller according to claim 7, wherein said fourth means includes:

division means, responsive to the external signal, for outputting a difference quotient signal obtained by dividing a difference between the previous and present external signal by the previous external signal, and means for generating the static characteristic compensation signal from a product of the difference quotient signal and the second signal.

10. A controller according to claim 7, wherein said fourth means includes:

difference means, responsive to the external signal, for outputting a difference signal between the present and previous external signals, multiplication means for generating a product signal from a product of the difference signal and the second signal, and division means for dividing the product signal by the previous external signal, to output the static characteristic compensation signal.

11. A controller according to claim 1, wherein said fourth means includes:

division means, responsive to the external signal, for outputting a difference quotient signal obtained by dividing a difference between the previous and present external signal by the previous external signal, and means for generating the static characteristic compensation signal from a product of the difference quotient signal and the second signal.

12. A controller according to claim 1, wherein said fourth means includes:

difference means, responsive to the external signal, for outputting a difference signal between the present and previous external signals, multiplication means for generating a product signal from a product of the difference signal and the second signal, and division means for dividing the product signal by the previous external signal, to output the static characteristic compensation signal.

13. A controller according to claim 1, wherein said fourth means includes:

difference means, responsive to the external signal, for outputting a difference signal between the present and previous external signals, division means for outputting a quotient signal obtained by dividing the second signal, obtained when the previous external signal is obtained, by the previous external signal, and multiplication means for generating the static characteristic compensation signal from a product of the difference signal and the quotient signal.

14. A controller according to claim 13, wherein said fourth means further includes:

filter means, arranged between said division means and said multiplication means, for supplying a filtered quotient signal, which is obtained by low-pass filtering said quotient signal, to said multiplication means.

15. A process controller for performing feedforward control in accordance with a variation in load for a feedback control system, comprising:

change fetch means for fetching a change in a feedforward controlled variable, in accordance with a variation in load; and control means, coupled to said change fetch means, for performing feedforward control in accordance with a compensation signal obtained by multiplying the change in the feedforward controlled variable with a ratio of an adjusted output signal of the feedback control system, corrected by feedforward control to the feedforward controlled variable.

* * * * *